United States Patent [19]

Nadas et al.

[11] Patent Number: 5,263,117
[45] Date of Patent: Nov. 16, 1993

[54] METHOD AND APPARATUS FOR FINDING THE BEST SPLITS IN A DECISION TREE FOR A LANGUAGE MODEL FOR A SPEECH RECOGNIZER

[75] Inventors: Arthur J. Nadas, Rock Tavern; David Nahamoo, White Plains, both of N.Y.

[73] Assignee: International Business Machines Corporation, Armonk, N.Y.

[21] Appl. No.: 427,420

[22] Filed: Oct. 26, 1989

[51] Int. Cl.$^5$ .............................................. G10L 9/02
[52] U.S. Cl. ........................................................ 395/2
[58] Field of Search ................................... 381/41–46; 364/513.5

[56] References Cited

U.S. PATENT DOCUMENTS

| | | | |
|---|---|---|---|
| 4,181,813 | 1/1980 | Marley | 179/15 E |
| 4,596,031 | 6/1986 | Hakaridani et al. | 381/43 |
| 4,658,429 | 4/1987 | Orita et al. | 382/36 |
| 4,682,365 | 7/1987 | Orita et al. | 382/14 |
| 4,719,571 | 1/1988 | Rissanen et al. | 364/300 |
| 4,731,725 | 3/1988 | Suto et al. | 364/415 |
| 4,759,068 | 7/1988 | Bahl et al. | 381/43 |
| 4,771,467 | 9/1988 | Catros et al. | 382/6 |
| 4,852,173 | 7/1989 | Bahl et al. | 381/43 |

OTHER PUBLICATIONS

Breiman, *Classification and Regression Trees*, Wadsworth Inc., 1984, pp. 101–102.
*Encyclopedia of Statistical Sciences*, vol. 2, John Wiley and Sons, 1982, pp. 512–516.

Primary Examiner—Michael R. Fleming
Assistant Examiner—Michelle Doerrler
Attorney, Agent, or Firm—Marc D. Schechter

[57] ABSTRACT

A method and apparatus for finding the best or near best binary classification of a set of observed events, according to a predictor feature X so as to minimize the uncertainty in the value of a category feature Y. Each feature has three or more possible values. First, the predictor feature value and the category feature value of each event is measured. The events are then split, arbitrarily, into two sets of predictor feature values. From the two sets of predictor feature values, an optimum pair of sets of category feature values is found having the lowest uncertainty in the value of the predictor feature. From the two optimum sets of category feature values, an optimum pair of sets is found having the lowest uncertainty in the value of the category feature. An event is then classified according to whether its predictor feature value is a member of a set of optimal predictor feature values.

2 Claims, 4 Drawing Sheets

METHOD AND APPARATUS FOR FINDING THE BEST SPLITS IN A DECISION TREE FOR A LANGUAGE MODEL FOR A SPEECH RECOGNIZER

BACKGROUND OF THE INVENTION

The invention relates to the binary classification of observed events for constructing decision trees for use in pattern recognition systems. The observed events may be, for example, spoken words or written characters. Other observed events which may be classified according to the invention include, but are not limited to medical symptoms, and radar patterns of objects.

More specifically, the invention relates to finding an optimal or near optimal binary classification of a set of observed events (i.e. a training set of observed events), for the creation of a binary decision tree. In a binary decision tree, each node of the tree has one input path and two output paths (e.g. Output Path A and Output Path B). At each node of the tree, a question is asked of the form "Is X an element of the set SX?" If the answer is "Yes", then Output Path A is followed from the node. If the answer is "No", then Output Path B is followed from the node.

In general, each observed event to be classified has a predictor feature X and a category feature Y. The predictor feature has one of M different possible values $X_m$, and the category feature has one of N possible values $Y_n$, where m and n are positive integers less than or equal to M and N, respectively.

In constructing binary decision trees, it is advantageous to find the subset $SX_{opt}$ of SX for which the information regarding the category feature Y is maximized, and the uncertainty in the category feature Y is minimized. The answer to the question "For an observed event to be classified, is the value of the predictor feature X an element of the subset $SX_{opt}$?" will then give, on average over a plurality of observed events, the maximum reduction in the uncertainty about the value of the category feature Y.

One known method of finding the best subset $SX_{opt}$ for minimizing the uncertainty in the category feature Y is by enumerating all subsets of SX, and by calculating the information or the uncertainty in the value of the category feature Y for each subset. For a set SX having M elements, there are $2^{(M-1)} - 1$ different possible subsets. Therefore, $2^{(M-1)} - 1$ information or uncertainty computations would be required to find the best subset SX. This method, therefore, is not practically possible for large values of M, such as would be encountered in automatic speech recognition.

Leo Breiman et al (*Classification And Regression Trees*, Wadsworth Inc., Monterey, Calif., 1984, pages 101-102) describe a method of finding the best subset $SX_{opt}$ for the special case where the category feature Y has only two possible different values $Y_1$ and $Y_2$ (that is, for the special case where N=2). In this method, the complete enumeration requiring $2^{(M-1)} - 1$ information computations can be replaced by information computations for only (M-1) subsets.

The Breiman et al method is based upon the fact that the best subset $SX_{opt}$ of the set SX is among the increasing sequence of subsets defined by ordering the predictor feature values $X_m$ according to the increasing value of the conditional probability of one value $Y_1$ of the category feature Y for each value $X_m$ of the predictor feature X.

That is, the predictor feature values $X_m$ are first ordered, in the Breiman et al method, according to the values of $P(Y_1|X_m)$. Next, a number of subsets $SX_i$ of set SX are defined, where each subset $SX_i$ contains only those values $X_m$ having the i lowest values of the conditional probability $P(Y_1|X_m)$. When there are M different values of $X_m$, there will be (M-1) subsets $SX_i$.

As described by Breiman et al, one of the subsets $SX_i$ maximizes the information, and therefore minimizes the uncertainty in the value of the class Y.

While Breiman et al provided a shortened method for finding the best binary classification of events according to a measurement or predictor variable X for the simple case where the events fall into only two classes or categories $Y_1$ and $Y_2$, Breiman et al do not describe how to find the best subset of the predictor variable X when the events fall into more than two classes or categories.

SUMMARY OF THE INVENTION

It is an object of the invention to provide a method and apparatus for finding the optimum or near optimum binary classification of a set of observed events according to a predictor feature X having three or more different possible values $X_m$, so as to minimize the uncertainty in the value of the category feature Y of the observed events, where the category feature Y has three or more possible values $Y_n$.

It is another object of the invention to provide such a classification method in which the optimum or near optimum classification of the predictor feature X can be found without enumerating all of the possible different subsets of the values of the predictor feature X, and without calculating the uncertainty in the value of the category feature Y for each of the subsets.

The invention is a method and apparatus for classifying a set of observed events. Each event has a predictor feature X and a category feature Y. The predictor feature has one of M different possible values $X_m$, and the category feature has one of N possible values $Y_n$. In the method, M and N are integers greater than or equal to 3, m is an integer from 1 to M, and n is an integer from 1 to N.

According to the invention, the predictor feature value $X_m$ and the category feature value $Y_m$ of each event in the set of observed events are measured. From the measured predictor feature values and the measured category feature values, the probability $P(X_m, Y_n)$ of occurrence of an event having a category feature value $Y_n$ and a predictor feature value $X_m$ are estimated for each $Y_n$ and each $X_m$.

Next, a starting set $SX_{opt}(t)$ of predictor feature values $X_m$ is selected. The variable t has any initial value.

From the estimated probabilities, the conditional probability $P(SX_{opt}(t)|Y_n)$ that the predictor feature has a value in the set $SX_{opt}(t)$ when the category feature has a value $Y_n$ is calculated for each $Y_n$.

From the conditional probabilities $P(SX_{opt}(t)|Y_n)$ a number of pairs of sets $SY_j(t)$ and $\overline{SY_j}(t)$ of category feature values $Y_n$ are defined, where j is an integer from 1 to (N-1). Each set $SY_j(t)$ contains only those category feature values $Y_n$ having the j lowest values of the conditional probability $P(SX_{opt}(t)|Y_n)$. Each set $\overline{SY_j}(t)$ contains only those category feature values $Y_n$ having the (N-j) highest values of the conditional probability. Thus, $\overline{SY_j}(t)$ is the complement of $SY_j(t)$.

From the $(N-1)$ pairs of sets defined above, a single pair of sets $SY_{opt}(t)$ and $\overline{SY}_{opt}(t)$ is found having the lowest uncertainty in the value of the predictor feature.

Now, from the estimated event probabilities $P(X_m, Y_n)$, the conditional probability $P(SY_{opt}(t)|X_m)$ that the category feature has a value in the set $SY_{opt}(t)$ when the predictor feature has a value $X_m$ is calculated for each value $X_m$. A number of pairs of sets $SX_i(t+1)$ and $\overline{SX}_i(t+1)$ of predictor feature values $X_m$ are defined where i is an integer from 1 to M. Each set $SX_i(t+1)$ contains only those predictor feature values $X_m$ having the i lowest values of the conditional probability $P(SY_{opt}(t)|X_m)$. Each set $\overline{SX}_i(t+1)$ contains only those predictor feature values $X_m$ having the $(M-i)$ highest values of the conditional probability. There are $(M-1)$ pairs of such sets.

From the $(M-1)$ pairs of sets defined above, a single pair of sets $SX_{opt}(t+1)$ and $\overline{SX}_{opt}(t+1)$ is found having the lowest uncertainty in the value of the category feature.

Thereafter, an event is classified in a first class if the predictor feature value of the event is a member of the set $SX_{opt}(t+1)$. An event is classified in a second class if the predictor feature value of the event is a member of the set $\overline{SX}_{opt}(t+1)$.

In one aspect of the invention, an event is classified in the first class or the second class by producing a classification signal identifying the event as a member of the first class or the second class.

In another aspect of the invention, the method is iteratively repeated until the set $SX_{opt}(t+1)$ is equal or substantially equal to the previous set $SX_{opt}(t)$.

Preferably, the pair of sets having the lowest uncertainty is found by calculating the uncertainty for every pair of sets. Alternatively, the pair of sets having the lowest uncertainty may be found by calculating the uncertainty of each pair of sets in the order of increasing conditional probability. The pair of sets with the lowest uncertainty is found when the calculated uncertainty stops decreasing.

In a further aspect of the invention, the predictor feature value of an event not in the set of events is measured. The event is classified in the first class if the predictor feature value is a member of the set $SX_{opt}(t+1)$, and the event is classified in the second class if the predictor feature value is a member of the set $\overline{SX}_{opt}(t+1)$.

In the method and apparatus according to the present invention, each event may be, for example, a spoken utterance in a series of spoken utterances. The utterances may be classified according to the present invention, for example, for the purpose of producing models of similar utterances. Alternatively, for example, the utterances may be classified according to the present invention for the purpose of recognizing a spoken utterance.

In another example, each event is a spoken word in a series of spoken words. The predictor feature value of a word comprises an identification of the immediately preceding word in the series of spoken words.

The invention also relates to a method and apparatus for automatically recognizing a spoken utterance. A predictor word signal representing an uttered predictor word is compared with predictor feature signals in a decision set. If the predictor word signal is a member of the decision set, a first predicted word is output, otherwise a second predicted word is output.

The method and apparatus according to the invention are advantageous because they can identify, for a set of observed events, the subset of predictor feature values of the events which minimize or near minimize the uncertainty in the value of the category feature of the events, where the category feature has three or more possible values. The invention finds this subset of predictor feature values in an efficient manner without requiring a complete enumeration of all possible subsets of predictor feature values.

DESCRIPTION OF THE PREFERRED EMBODIMENTS

Figure 1:
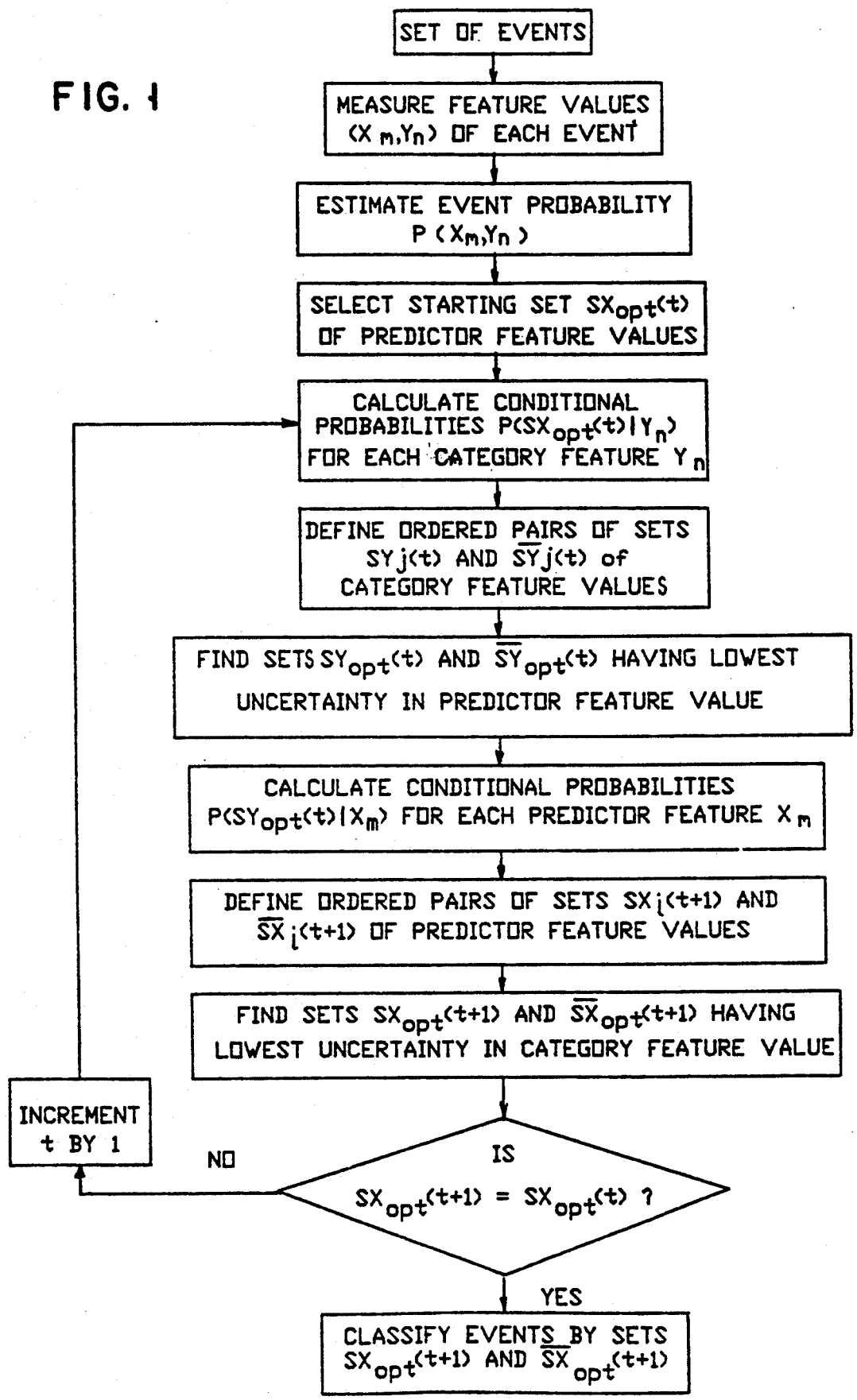
FIG. 1 is a flow chart of the method of classifying a set of observed events according to the present invention.

FIG. 1 is a flow chart of the method of classifying a set of observed events according to the present invention. Each event in the set of observed events has a predictor feature X and a category feature Y. The predictor feature has one of M different possible values $X_m$. The category feature has one of N possible values $Y_n$. M and N are positive integers greater than or equal to 3, and need not be equal to each other. The variable m is a positive integer less than or equal to M. The variable n is a positive integer less than or equal to N.

Each event in the set of observed events may be, for example, a sequence of uttered words. For example, each event may comprise a prior word, and a recognition word following the prior word. If the predictor feature is the prior word, and the category feature is the recognition word, and if it is desired to classify the events by finding the best subset of prior words which minimizes the uncertainty in the value of the recognition word, then the classification method according to the present invention can be used to identify one or more candidate values of the recognition word when the prior word is known.

Other types of observed events having predictor feature/category features which can be classified by the method according to the present invention include, for example, medical symptoms/illnesses, radar patterns/objects, and visual patterns/characters. Other observed events can also be classified by the method of the present invention.

For the purpose of explaining the operation of the invention, the observed events will be described as prior word/recognition word events. In practice, there may be thousands of different words in a language model, and hence the predictor feature of an event will have one of thousands of different available predictor feature values. Similarly, the category feature of an event will have one of thousands of different available category feature values. In such a case, to find the best subset $SX_{opt}$ of the predictor feature values which minimizes the uncertainty in the value of the category feature, would require the enumeration of $2^{(M-1)}-1$ subsets. For values of M in the thousands, this is not practical.

According to the present invention, it is only necessary to enumerate at most approximately $K(M+N)$ subsets to find the best subset $SX_{opt}$, as described below. K is a constant, for example 6.

While the predictor feature and the category feature may have thousands of different possible values, for the purpose of explaining the invention an example will be described in which $M=5$ and $N=5$. In general, M need not equal N.

Table 1 shows an example of a predictor feature having five different possible values $X_1$ to $X_5$. The predictor feature (prior word) values are "travel", "credit", "special", "trade", and "business", respectively.

TABLE 1

| PREDICTOR FEATURE VALUE | PRIOR WORD (PREDICTOR WORD) |
|---|---|
| $X_1$ | travel |
| $X_2$ | credit |
| $X_3$ | special |
| $X_4$ | trade |
| $X_5$ | business |

Table 2 shows a category feature having five different possible values $Y_1$ to $Y_5$. The category feature (recognition word) values are "agent", "bulletin", "management", "consultant", and "card", respectively.

TABLE 2

| CATEGORY FEATURE VALUE | RECOGNITION WORD (PREDICTED WORD) |
|---|---|
| $Y_1$ | agent |
| $Y_2$ | bulletin |
| $Y_3$ | management |
| $Y_4$ | consultant |
| $Y_5$ | card |

Returning to FIG. 1, according to the invention the predictor feature value $X_m$ and the category feature $Y_n$ of each event in the set of events are measured. Table 3 shows an example of possible measurements for ten hypothetical events.

TABLE 3

| EVENT | PREDICTOR FEATURE VALUE | CATEGORY FEATURE VALUE |
|---|---|---|
| 1 | $X_5$ | $Y_4$ |
| 2 | $X_1$ | $Y_5$ |
| 3 | $X_3$ | $Y_4$ |
| 4 | $X_3$ | $Y_1$ |
| 5 | $X_4$ | $Y_4$ |
| 6 | $X_2$ | $Y_5$ |
| 7 | $X_3$ | $Y_3$ |
| 8 | $X_5$ | $Y_5$ |
| 9 | $X_2$ | $Y_4$ |
| 10 | $X_4$ | $Y_2$ |

From the measured predictor feature values and the measured category feature values in Table 3, the probability $P(X_m, Y_n)$ of occurrence of an event having a category feature value $Y_n$ and a predictor feature value $X_m$ is estimated for each $Y_n$ and each $X_m$. If the set of events is sufficiently large, the probability $P(X_a, Y_b)$ of occurrence of an event having a category feature value $Y_b$ and a predictor feature value $X_a$ can be estimated as the total number of events in the set of observed events having feature values $(X_a, Y_b)$ divided by the total number of events in the set of observed events.

Table 4 is an example of hypothetical estimates of the probabilities $P(X_m, Y_n)$.

TABLE 4

| | $P(X_m, Y_n)$ | | | | |
|---|---|---|---|---|---|
| $Y_5$ | 0.030616 | 0.024998 | 0.082165 | 0.014540 | 0.008761 |
| $Y_4$ | 0.014505 | 0.013090 | 0.068134 | 0.054667 | 0.024698 |
| $Y_3$ | 0.074583 | 0.048437 | 0.035092 | 0.076762 | 0.000654 |
| $Y_2$ | 0.042840 | 0.081654 | 0.011594 | 0.055642 | 0.050448 |
| $Y_1$ | 0.022882 | 0.051536 | 0.032359 | 0.005319 | 0.074012 |
| | $X_1$ | $X_2$ | $X_3$ | $X_4$ | $X_5$ |

After the probabilities are estimated, a starting set $SX_{opt}(t)$ of predictor feature values $X_m$ is selected. The variable t has any initial value. In our example, we will arbitrarily select the starting set $SX_{opt}(t)$ equal to the predictor feature values $X_1$ and $X_2$ (that is, the prior words "travel" and "credit").

Continuing through the flow chart of FIG. 1, from the estimated probabilities $P(X_m, Y_n)$, the conditional probability $P(SX_{opt}(t)|Y_n)$ that the predictor feature has a value in the set $SX_{opt}(t)$ when the category feature has a value $Y_n$ is calculated for each $Y_n$. Table 5 shows the joint probabilities of $SX_{opt}(t)$ and $Y_n$, the joint probabilities of $\overline{SX}_{opt}(t)$ and $Y_n$, and the conditional probability of $SX_{opt}(t)$ given $Y_n$ for each value of the category feature Y, and for t equal 1. These numbers are based on the probabilities shown in Table 4, where $$P(SX_{opt}(t), Y_n) = P(X_1, Y_n) + P(X_2, Y_n),$$

$$P(\overline{SX}_{opt}(t), Y_n) = P(X_3, Y_n) + P(X_4, Y_n) + P(X_5, Y_n),$$

and $$P(SX_{opt}(t)|Y_n) = \frac{P(SX_{opt}(t), Y_n)}{P(SX_{opt}(t), y_n) + P(\overline{SX}_{opt}(t), Y_n)}$$

TABLE 5

| | $P(SX_{opt}(t), Y_n)$ | $P(\overline{SX}_{opt}(t), Y_n)$ | $P(SX_{opt}(t)|Y_n)$ |
|---|---|---|---|
| $Y_5$ | 0.055614 | 0.105466 | 0.345258 |
| $Y_4$ | 0.027596 | 0.147501 | 0.157604 |
| $Y_3$ | 0.123021 | 0.112509 | 0.522314 |
| $Y_2$ | 0.124494 | 0.117686 | 0.514056 |
| $Y_1$ | 0.074418 | 0.111691 | 0.399862 |

$SX_{opt}(t) = \{X_1, X_2\}$
$\overline{SX}_{opt}(t) = \{X_3, X_4, X_5\}$
$t = 1$ After the conditional probabilities are calculated, a number of ordered pairs of sets $SY_j(t)$ and $\overline{SY}_j(t)$ of category feature values $Y_n$ are defined. The number j of sets is a positive integer less than or equal to $(N-1)$. Each set $SY_j(t)$ contains only those category feature values $Y_n$ having the j lowest values of the conditional probability $P(SX_{opt}(t)|Y_n)$. Each set $\overline{SY}_j(t)$ contains only those category feature values $Y_n$ having the $(N-j)$ highest values of the conditional probability.

From the conditional probabilities of Table 5, Table 6 shows the ordered pairs of sets $SY_1(t)$ and $\overline{SY}_1(t)$ to $SY_5(t)$ and $\overline{SY}_5(t)$. Table 6 also shows the category feature values $Y_n$ in each set.

TABLE 6

| SET SY_j(t) $\overline{SY}_j(t)$ | CATEGORY FEATURE VALUES | UNCERTAINTY (From TABLE 4) | UNCERTAINTY (From TABLE 5) |
| --- | --- | --- | --- |
| $SY_1(t)$ | $Y_4$ | 2.258366 | 0.930693 |
| $\overline{SY}_1(t)$ | $Y_5, Y_1, Y_2, Y_3$ | | |
| $SY_2(t)$ | $Y_4, Y_5$ | 2.204743 | 0.934793 |
| $\overline{SY}_2(t)$ | $Y_1, Y_2, Y_3$ | | |
| $SY_3(t)$ | $Y_4, Y_5, Y_1$ | 2.207630 | 0.938692 |
| $\overline{SY}_3(t)$ | $Y_2, Y_3$ | | |
| $SY_4(t)$ | $Y_4, Y_5, Y_1, Y_2$ | 2.214523 | 0.961389 |
| $\overline{SY}_4(t)$ | $Y_3$ | | |

$SY_{opt}(t) = SY_2(t) = \{Y_4, Y_5\}$
$\overline{SY}_{opt}(t) = \overline{SY}_2(t) = \{Y_1, Y_2, Y_3\}$
$t = 1$ For each of the (N−1) ordered pairs of sets $SY_j$ and $\overline{SY}_j$, the uncertainty in the value of the predictor feature $X_m$ may be calculated in two different ways. Preferably, the uncertainty is calculated from the probabilities of Table 4. Alternatively, uncertainty may also be calculated from the probabilities of Table 5. In general, an uncertainty calculation based upon the individual probabilities of Table 4 will be more accurate than an uncertainty calculation based upon the sets $SX_{opt}(t)$ and $\overline{SX}_{opt}(t)$ probabilities of Table 5. However, calculating the uncertainty in the reduced Table 5 is faster, and may lead to the same result.

In Table 6, the uncertainty H(Split $SY_j(t)$) in the value of the predictor feature X for the sets $SY_j(t)$ and $\overline{SY}_j(t)$ was calculated from the Table 4 probabilities according to the formula $$H(\text{Split } SY_j(t)) = P(SY_j(t)) H(X_m|SY_j(t)) + P(\overline{SY}_j(t)) H(X_m|\overline{SY}_j(t)),$$

where $$H(X_m|SY_j(t)) = -\sum_{m=1}^{M} P(X_m|SY_j(t)) \log P(X_m|SY_j(t)),$$

$$P(X_m|SY_j(t)) = \frac{P(X_m, SY_j(t))}{P(SY_j(t))},$$

$$P(SY_j(t)) = \sum_{m=1}^{M} P(X_m, SY_j(t)),$$

and $$P(X_m, SY_j(t)) = \sum_{Y_n \in SY_j(t)} P(X_m, Y_n).$$

In Table 6, the base 2 logarithm was used. (See, for example, *Encyclopedia of Statistical Sciences*, Volume 2, John Wiley & Sons, 1982, pages 512–516.)

Thus, the uncertainty in the value of a feature for a pair of sets was calculated as the sum of the products of the probability of occurrence of an event in the set, for example $P(SY_j(t))$, times the uncertainty, for example $H(X_m|SY_j(t))$, for that set.

As shown in Table 6, the pair of sets $SY_{opt}(t)$ and $\overline{SY}_{opt}(t)$ having the lowest uncertainty in the value of the predictor feature X is the pair of sets $SY_2(t)$ and $\overline{SY}_2(t)$, as calculated from the probabilities of Table 4.

From the estimated probabilities $P(X_m, Y_n)$, new conditional probabilities $P(SY_{opt}(t)|X_m)$ that the category feature has a value in the set $SY_{opt}(t)$ when the predictor feature has a value $X_m$ are calculated for each $X_m$. Table 7 shows these conditional probabilities, based on the joint probabilities of Table 4, where $$P(SY_{opt}(t), X_m) = P(Y_4, X_m) + P(Y_5, X_m)$$

$$P(\overline{SY}_{opt}(t), X_m) = P(Y_1, X_m) + P(Y_2, X_m) + P(Y_3, X_m)$$

$$P(SY_{opt}(t)|X_m) = \frac{P(SY_{opt}(t), X_m)}{P(SY_{opt}(t), X_m) + P(\overline{SY}_{opt}(t), X_m)}$$

TABLE 7

| | $P(SY_{opt}(t), X_m)$ | $P(\overline{SY}_{opt}(t), X_m)$ | $P(SY_{opt}(t)|X_m)$ |
| --- | --- | --- | --- |
| $X_5$ | 0.033459 | 0.125115 | 0.211002 |
| $X_4$ | 0.069207 | 0.137724 | 0.334445 |
| $X_3$ | 0.150300 | 0.079046 | 0.655340 |
| $X_2$ | 0.038088 | 0.181628 | 0.173353 |
| $X_1$ | 0.045122 | 0.140305 | 0.243340 |

$SY_{opt}(t) = \{Y_4, Y_5\}$
$\overline{SY}_{opt}(t) = \{Y_1, Y_2, Y_3\}$
$t = 1$ Next, ordered pairs of sets $SX_i(t+1)$ and $\overline{SX}_i(t+1)$ of predictor features $X_m$ are defined. The variable i is a positive integer less than or equal to (M−1). Each set $SX_i(t+1)$ contains only those predictor feature values $X_m$ having the i lowest values of the conditional probability $P(SY_{opt}(t)|X_m)$. Each set $\overline{SX}_i(t+1)$ contains only those predictor feature values $X_m$ having the (M−i) highest values of the conditional probabilities.

Table 8 shows the ordered pairs of sets $SX_1(t+1)$ and $\overline{SX}_1(t+1)$ to $SX_4(t+1)$ and $\overline{SX}_4(t+1)$ of predictor feature values based upon the conditional probabilities of Table 7. Table 8 also shows the predictor feature values associated with each set.

TABLE 8

| SET $SX_i(t+1)$ $\overline{SX}_i(t+1)$ | PREDICTOR FEATURE VALUES | UNCERTAINTY (From TABLE 4) | UNCERTAINTY (From TABLE 7) |
| --- | --- | --- | --- |
| $SX_1(t+1)$ | $X_2$ | 2.264894 | 0.894833 |
| $\overline{SX}_1(t+1)$ | $X_5, X_1, X_4, X_3$ | | |
| $SX_2(t+1)$ | $X_2, X_5$ | 2.181004 | 0.876430 |
| $\overline{SX}_2(t+1)$ | $X_1, X_4, X_3$ | | |
| $SX_3(t+1)$ | $X_2, X_5, X_1$ | 2.201608 | 0.850963 |
| $\overline{SX}_3(t+1)$ | $X_4, X_3$ | | |
| $SX_4(t+1)$ | $X_2, X_5, X_1, X_4$ | 2.189947 | 0.827339 |
| $\overline{SX}_4(t+1)$ | $X_3$ | | |

$SX_{opt}(t+1) = SX_2(t+1) = \{X_2, Y_5\}$
$\overline{SX}_{opt}(t+1) = \overline{SX}_2(t+1) = \{X_1, X_4, X_3\}$
$t = 1$ In a similar manner as described above with respect to Table 6, the uncertainties in the values of the category feature were calculated for each pair of sets from the probabilities in Tables 4 and 7, respectively. As shown in Table 8, the pair of sets $SX_{opt}(t+1)$ and $\overline{SX}_{opt}(t+1)$ having the lowest uncertainty in the value of the category feature were $SX_2(t+1)$ and $\overline{SX}_2(t+1)$, where t=1, as calculated from the probabilities of Table 4.

Finally, having found the pair of sets $SX_{opt}(t+1)$ and $\overline{SX}_{opt}(t+1)$, an event is classified in a first class if the predictor feature value of the event is a member of the set $SX_{opt}(t+1)$. If the predictor feature value of an event is a member of the set $\overline{SX}_{opt}(t+1)$, then the event is classified in a second class.

While it is possible, according to the present invention, to classify the set of observed events according to the first values of $SX_{opt}(t+1)$ and $\overline{SX}_{opt}(t+1)$ obtained, better subsets can be obtained by repeating the process. That is, after finding a pair of sets $SX_{opt}(t+1)$ and $\overline{SX}_{opt}(t+1)$, but prior to classifying an event, it is preferred to increment t by 1, and then repeat the steps from calculating the conditional probabilities $P(SX_{opt}(t)|Y_n)$ through finding $SX_{opt}(t+1)$ and $\overline{SX}_{opt}(t+1)$. These steps may be repeated, for example, until the set $SX_{opt}(t+1)$ is equal or substantially equal to the previous set $SX_{opt}(t)$. Alternatively, these steps may be repeated a selected number of times.

The present invention was used to classify sets of events based on randomly generated probability distributions by repeating the steps described above, and by stopping the repetition when $SX_{opt}(t+1)=SX_{opt}(t)$. The classification was repeated 100 times each for values of M from 2 to 12 and values of N from 2 to 16. The classification was completed in all cases after not more than 5 iterations, so that fewer than 5 (M+N) subsets were examined. The information (uncertainty) in the classifications obtained by the invention were close to the optimum.

Figure 2:
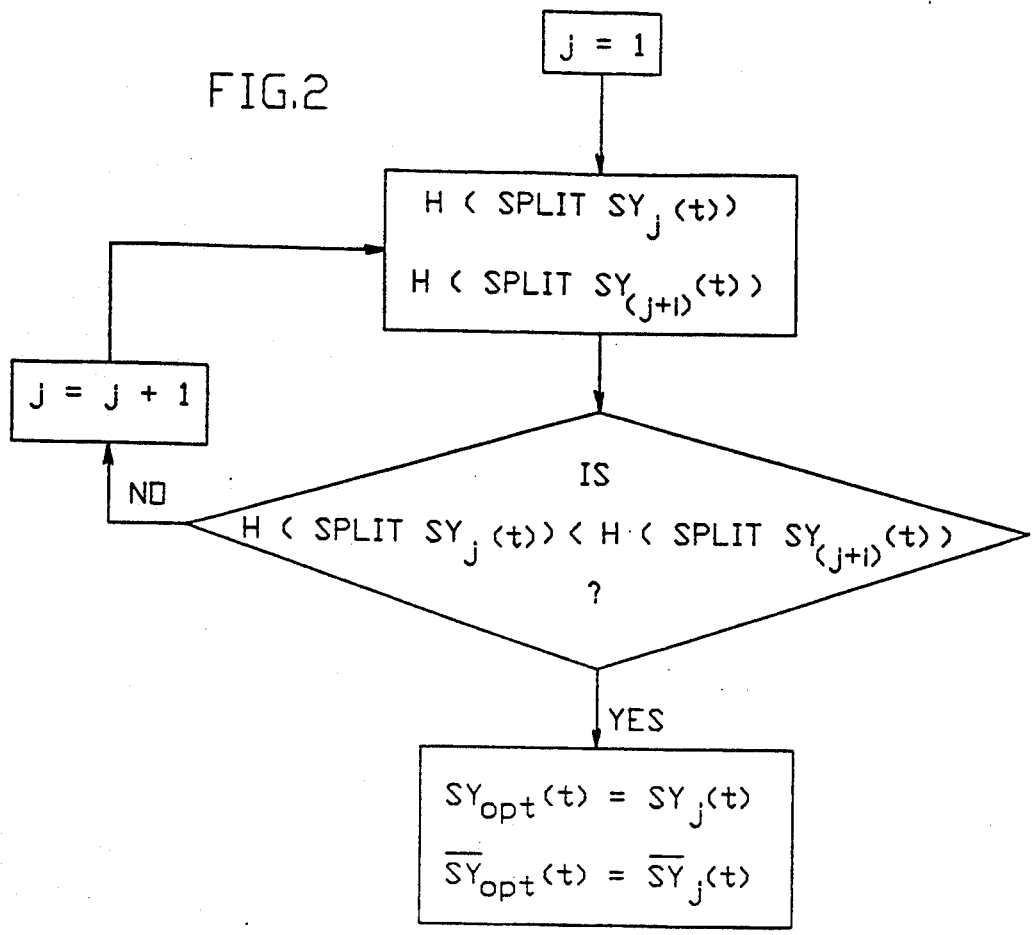
FIG. 2 is a flow chart showing how the sets with the lowest uncertainty are found.

FIG. 2 is a flow chart showing one manner of finding the sets $SY_{opt}(t)$ and $\overline{SY}_{opt}(t)$ having the lowest uncertainty in the value of the predictor feature. After the ordered pairs of sets $SY_j$ and $\overline{SY}_j$ are defined, the variable j is set equal to 1. Next, the uncertainty $H(\text{Split } SY_j(t))$ is calculated for sets $SY_j(t)$ and $\overline{SY}_j(t)$, and the uncertainty $H(\text{Split } SY_{(j+1)}(t))$ is calculated for the sets $SY_{(j+1)}$ and $\overline{SY}_{(j+1)}(t)$. The uncertainty $H(\text{Split } SY_j(t))$ is then compared to the uncertainty $H(\text{Split } SY_{(j+1)}(t))$. If $H(\text{Split } SY_j(t))$ is less than $H(\text{Split } SY_{(j+1)}(t))$ then $SY_{opt}(t)$ is set equal to $SY_j(t)$, and $\overline{SY}_{opt}(t)$ is set equal to $\overline{SY}_j(t)$. If $H(\text{Split } SY_j(t))$ is not less than $H(\text{Split } SY_{(j+1)}(t))$, then j is incremented by 1, and the uncertainties are calculated for the new value of j.

The sets $SX_{opt}(t+1)$ and $\overline{SX}_{opt}(t+1)$ having the lowest uncertainty in the value of the category feature can be found in the same manner.

Figure 3:
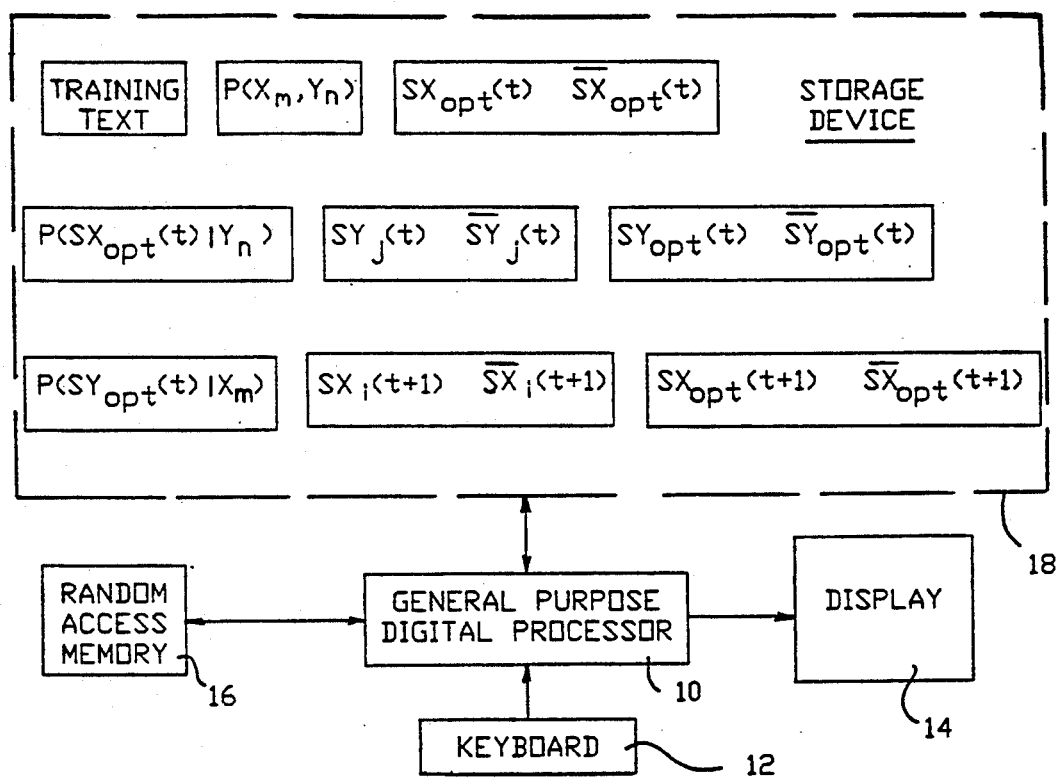
FIG. 3 is a block diagram of an apparatus for classifying a set of observed events according to the present invention.

FIG. 3 schematically shows an apparatus for classifying a set of observed events. The apparatus may comprise, for example, an appropriately programmed computer system. In this example, the apparatus comprises a general purpose digital processor 10 having a data entry keyboard 12, a display 14, a random access memory 16, and a storage device 18. Under the control of a program stored in the random access memory 16, the processor 10 retrieves the predictor feature values $X_m$ and the category feature values $Y_n$ from the training text in storage device 18. From the feature values of the training text, processor 10 calculates estimated probabilities $P(X_m, Y_n)$ and stores the estimated probabilities in storage device 18.

Next, processor 10 selects a starting set $SX_{opt}(t)$ of predictor feature values. For example, the set $SX_{opt}(t)$, where t has an initial value, may include the predictor feature values $X_1$ through $X_{M/2}$ when (M is an even integer), or $X_1$ through $X_{M+1/2}$ (when M is an odd integer). Any other selection is acceptable.

From the probabilities $P(X_m, Y_n)$ in storage device 18, processor 10 calculates the conditional probabilities $P(SX_{opt}(t)|Y_n)$ and stores them in storage device 18. From the conditional probabilities, ordered pairs of sets $SY_j(t)$ and $\overline{SY}_j(t)$ are defined and stored in storage device 18.

Still under the control of the program, the processor 10 calculates the uncertainties of the (N−1) ordered pairs of sets, and stores the sets $SY_{opt}(t)$ and $\overline{SY}_{opt}(t)$ having the lowest uncertainty in the value of the predictor feature in the storage device 18.

In a similar manner, processor 10 finds and stores the sets $SX_{opt}(t+1)$ and $\overline{SX}_{opt}(t+1)$ having the lowest uncertainty in the value of the category feature.

Figure 4:
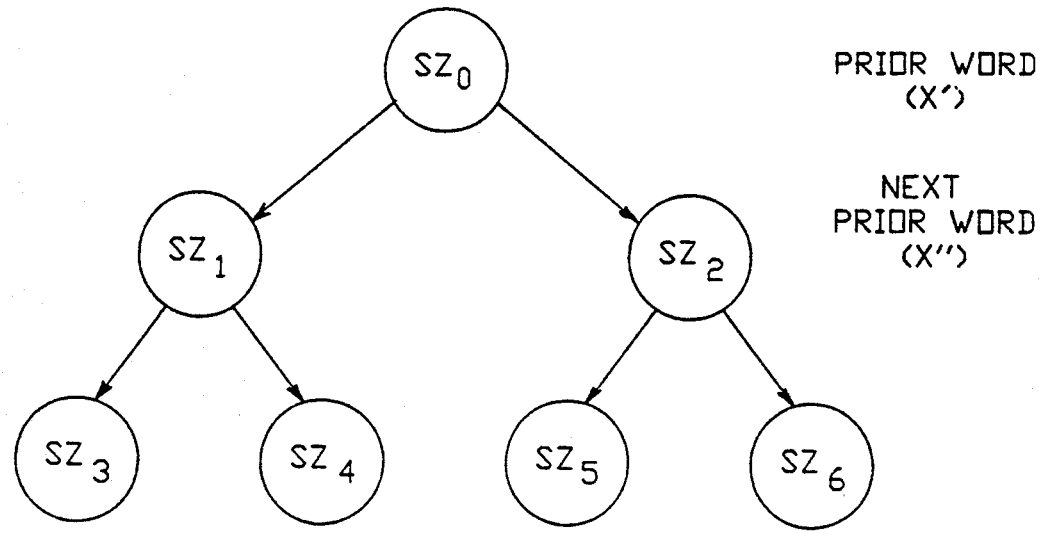
FIG. 4 shows a decision tree which may be constructed from the classifications produced by the method and apparatus according to the present invention.

FIG. 4 shows an example of a decision tree which can be generated by the method and apparatus according to the present invention. As shown in FIG. 4, each node of the decision tree is associated with a set $SZ_0$ through $SZ_6$ of events. The set $SZ_0$ at the top of the tree includes all values of all predictor features. The events in set $SZ_0$ are classified, in the second level of the tree, according to a first predictor feature $X'$, by using the method and apparatus of the present invention.

For example, if the first predictor feature $X'$ is the word which immediately precedes the word to be recognized Y, then the set of events $SZ_0$ is split into a set of events $SZ_1$, in which the prior word is a member of set $SX'_{opt}$ and a set $SZ_2$ in which the prior word is a member of the set $\overline{SX}'_{opt}$.

At the third level of the tree, the sets of events $SZ_1$ and $SZ_2$ are further split, for example, by a second predictor value $X''$ (the word next preceding the word to be recognized). Each node of the decision tree has associated with it a probability distribution for the value of the word to be recognized (the value of the category feature). As one proceeds through the decision tree, the uncertainty in the value of the word to be recognized Y is successively reduced.

Figure 5:
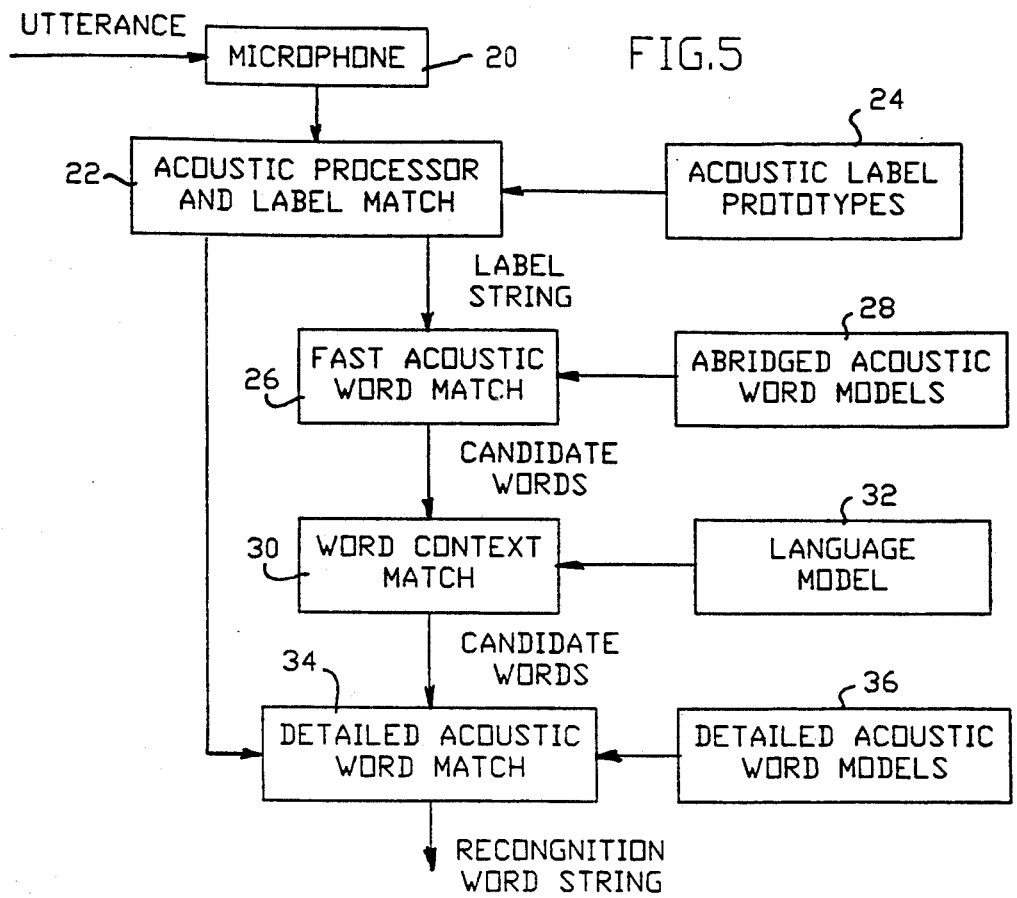
FIG. 5 is a block diagram of a speech recognition system containing a word context match according to the present invention.

FIG. 5 is a block diagram of an automatic speech recognition system which utilizes the classification method and apparatus according to the present invention. A similar system is described in, for example, U.S. Pat. No. 4,759,068. The system shown in FIG. 5 includes a microphone 20 for converting an utterance into an electrical signal. The signal from the microphone is processed by an acoustic processor and label match 22 which finds the best-matched acoustic label prototype from the acoustic label prototype store 24. A fast acoustic word match processor 26 matches the label string from acoustic processor 22 against abridged acoustic word models in store 28 to produce an utterance signal.

The utterance signal output by the fast acoustic word match processor comprises at least one predictor word signal representing a predictor word of the utterance. In general, however, the fast acoustic match processor will output a number of candidate predictor words.

Each predictor word signal produced by the fast acoustic word match processor 26 is input into a word context match 30 which compares the word context to language models in store 32 and outputs at least one category feature signal representing a candidate predicted word. From the recognition candidates produced by the fast acoustic match and the language model, the detailed acoustic match 34 matches the label string from acoustic processor 22 against detailed acoustic word models in store 36 and outputs a word string corresponding to the utterance.

Figure 6:
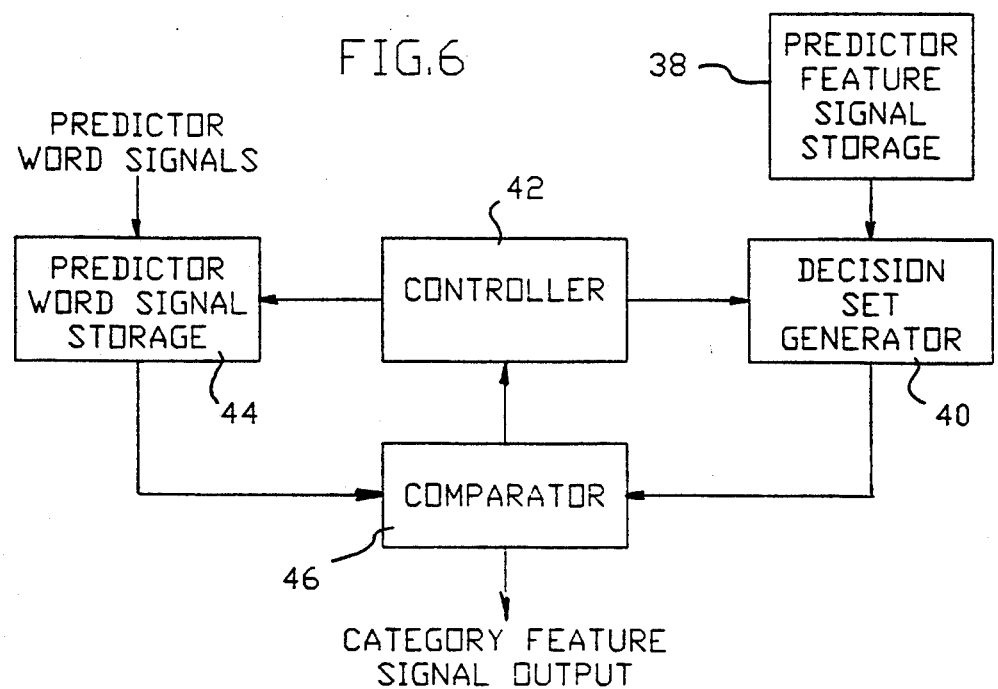
FIG. 6 is a block diagram of a portion of the word context match of FIG. 5.

FIG. 6 is a more detailed block diagram of a portion of the word context match 30 and language model 32. The word context match 30 and language model 32 include predictor feature signal storage 38 for storing all the predictor words. A decision set generator 40 (such as the apparatus described above with respect to FIG. 3) generates a subset of the predictor words for the decision set.

A controller 42 directs the storage of predictor word signals from the fast acoustic word match processor 26 in predictor word signal storage 44.

A predictor word signal addressed by controller 42 is compared with a predictor feature signal addressed by controller 42 in comparator 46. After the predictor word signal is compared with the decision set, a first category feature signal is output if the predictor word signal is a member of the decision set. Otherwise, a second category feature is output.

An example of the operation of the word context match 30 and language model 32 can be explained with reference to Tables 1, 2, and 9.

TABLE 9

| | $P(Y_n, SX_{opt}(t+1))$ | $P(Y_n, \overline{SX}_{opt}(t+1))$ | $P(Y_n|SX_{opt}(t+1))$ | $P(Y_n|\overline{SX}_{opt}(t+1))$ |
|---|---|---|---|---|
| $Y_5$ | 0.033759 | 0.127322 | 0.089242 | 0.204794 |
| $Y_4$ | 0.037788 | 0.137308 | 0.099893 | 0.220856 |
| $Y_3$ | 0.049092 | 0.186437 | 0.129774 | 0.299880 |
| $Y_2$ | 0.132102 | 0.110078 | 0.349208 | 0.177057 |
| $Y_1$ | 0.125548 | 0.060561 | 0.331881 | 0.097411 |

$SX_{opt}(t+1) = \{X_2, X_5\}$
$\overline{SX}_{opt}(t+1) = \{X_1, X_4, X_3\}$
$t = 1$ In an utterance of a string of words, a prior word (that is, a word immediately preceding the word to be recognized) is tentatively identified as the word "travel". According to Table 1, the prior word "travel" has a predictor feature value $X_1$. From Table 9, the word "travel" is in set $\overline{SX}_{opt}(t+1)$. Therefore, the probability of each value $Y_n$ of the word to be recognized is given by the conditional probability $P(Y_n|\overline{SX}_{opt}(t+1))$ in Table 9.

If we select the words with the first and second highest conditional probabilities, then the language model 26 will output words $Y_3$ and $Y_4$ ("management" and "consultant") as candidates for the recognition word following "travel". The candidates will then be presented to the detailed acoustic match for further examination.

We claim:

1. A method of automatic speech recognition comprising the steps of:

converting an utterance into an utterance signal representing the utterance, said utterance comprising a series of at least a predictor word and a predicted word, said utterance signal comprising at least one predictor word signal representing the predictor word;

providing a set of M predictor feature signals, each predictor feature signal having a predictor feature value $X_m$, where M is an integer greater than or equal to three and m is an integer greater than zero and lens than or equal to M, each predictor feature signal in the set representing a different word;

generating a decision set which contains a subset of the M predictor feature signals representing the words;

comparing the predictor word signal with the predictor feature signals in the decision set;

outputting a first category feature signal representing a first predicted word if the predictor word signal is a member of the decision set, said first category feature signal being one of N category feature signals, each category feature signal representing a different word and having a category feature value $Y_n$, where N is an integer greater than or equal to three, and n is an integer greater than zero and less than or equal to N; and outputting a second category feature signal, different from the first category feature signal and representing a second predicted word different from the first predicted word if the predictor word signal is not a member of the decision set;

characterized in that the contents of the decision set are generated by the steps of:

providing a training text comprising a set of observed events, each event having a predictor feature X representing a predictor word and a category feature Y representing a predicted word, said predictor feature having one of M different possible values $X_m$, each $X_m$ representing a different predictor word, said category feature having one of N possible values $Y_n$, each $Y_n$ representing a different predicted word;

(a) measuring the predictor feature value $X_m$ and the category feature value $Y_n$ of each event in the set of events;

(b) estimating, from the measured predictor feature values and the measured category feature values, the probability $P(X_m, Y_n)$ of occurrence of an event having a category feature value $Y_n$ and a predictor feature value $X_m$, for each $Y_n$ and each $X_m$;

(c) selecting a starting set $SX_{opt}(t)$ of predictor feature values $X_m$, where t has an initial value;

(d) calculating, from the estimated probabilities $P(X_m, Y_n)$, the conditional probability $P(SX_{opt}(t)|Y_n)$ that the predictor feature has a value in the set $SX_{opt}(t)$ when the category feature has a value $Y_n$, for each $Y_n$;

(e) defining a number of pairs of sets $SY_j(t)$ and $\overline{SY}_j(t)$ of category feature values $Y_n$, where j is an integer greater than zero and less than or equal to (N−1), each set $SY_j(t)$ containing only those category feature values $Y_n$ having the j lowest values of $P(SX_{opt}(t)|Y_n)$, each set $\overline{SY}_j(t)$ containing only those category feature values $Y_n$ having the (N−j) highest values of $P(SX_{opt}(t)|Y_n)$;

(f) finding a pair of sets $SY_{opt}(t)$ and $\overline{SY}_{opt}(t)$ from among the pairs of sets $SY_j(t)$ and $\overline{SY}_j(t)$ such that the pair of sets $SY_{opt}(t)$ and $\overline{SY}_{opt}(t)$ have the lowest uncertainty in the value of the predictor feature;

(g) calculating, from the estimated probabilities $P(X_m, Y_n)$, the conditional probability $P(SY_{opt}(t)|X_m)$ that the category feature has a value in the set $SY_{opt}(t)$ when the predictor feature has a value $X_m$, for each $X_m$;

(h) defining a number of pairs of sets $SX_i(t+1)$ and $\overline{SX}_i(t+1)$ of predictor feature values $X_m$, where i is an integer greater than zero and less than or equal to (M−1), each set $SX_i(t+1)$ containing only those predictor feature values $X_m$ having the i lowest values of $P(SY_{opt}(t)|X_m)$, each set $\overline{SX}_i(t+1)$ containing only those predictor feature values $X_m$ having the (M−i) highest values of $P(SY_{opt}(t)|X_m)$;

(i) finding a pair of sets $SX_{opt}(t+1)$ and $\overline{SX}_{opt}(t+1)$ from among the pairs of sets $SX_i(t+1)$ and $\overline{SX}_i(t+1)$ such that the pair of sets $SX_{opt}(t+1)$ and $\overline{SX}_{opt}(t+1)$ have the lowest uncertainty in the value of the category feature; and (1) setting the decision set equal to the set $SX_{opt}(t+1)$.

2. An automatic speech recognition system comprising:

means for converting an utterance into an utterance signal representing the utterance, said utterance comprising a series of at least a predictor word and a predicted word, said utterance signal comprising at least one predictor word signal representing the predictor word;

means for storing a set of M predictor feature signals, each predictor feature signal having a predictor feature value $X_m$, where M is an integer greater than or equal to three and m is an integer greater than zero and less than or equal to M, each predictor feature signal in the set representing a different word;

means for generating a decision set which contains a subset of the M predictor feature signals representing the words;

means for comparing the predictor word signal with the predictor feature signals in the decision set;

means for outputting a first category feature signal representing a first predicted word if the predictor word signal is a member of the decision set, said first category feature signal being one of N category feature signals, each category feature signal representing a different word and having a category feature value $Y_n$, where N is an integer greater than or equal to three, and n is an integer greater than zero and less than or equal to N; and means for outputting a second category feature signal, different from the first category feature signal and representing a second predicted word different from the first predicted word if the predictor word signal is not a member of the decision set;

characterized in that the means for generating the decision set comprises:

means for storing a training text comprising a set of observed events, each event having a predictor feature X representing a predictor word and a category feature Y representing a predicted word, said predictor feature having one of M different possible values $X_m$, each $X_m$ representing a different predictor word, said category feature having one of N possible values $Y_n$, each $Y_n$ representing a different predicted word;

(a) means for measuring the predictor feature value $X_m$ and the category feature value $Y_n$ of each event in the set of events;

(b) means for estimating, from the measured predictor feature values and the measured category feature values, the probability $P(X_m, Y_n)$ of occurrence of an event having a category feature value $Y_n$ and a predictor feature value $X_m$, for each $Y_n$ and each $X_m$;

(c) means for selecting a starting set $SX_{opt}(t)$ of predictor feature values $X_m$, where t has an initial value;

(d) means for calculating, from the estimated probabilities $P(X_m, Y_n)$, the conditional probability $P(SX_{opt}(t)|Y_n)$ that the predictor feature has a value in the set $SX_{opt}(t)$ when the category feature has a value $Y_n$, for each $Y_n$;

(e) means for defining a number of pairs of sets $SY_j(t)$ and $\overline{SY}_j(t)$ of category feature values $Y_n$, where j is an integer greater than zero and less than or equal to (N−1), each set $SY_j(t)$ containing only those category feature values $Y_n$ having the j lowest values of $P(SX_{opt}(t)|Y_n)$, each set $\overline{SY}_j(t)$ containing only those category feature values $Y_n$ having the (N−j) highest values of $P(SX_{opt}(t)|Y_n)$;

(f) means for finding a pair of sets $SY_{opt}(t)$ and $\overline{SY}_{opt}(t)$ from among the pairs of sets $SY_j(t)$ and $\overline{SY}_j(t)$ such that the pair of sets $SY_{opt}(t)$ and $\overline{SY}_{opt}(t)$ have the lowest uncertainty in the value of the predictor feature;

(g) means for calculating, from the estimated probabilities $P(X_m, Y_n)$, the conditional probability $P(SY_{opt}(t)|X_m)$ that the category feature has a value in the set $SY_{opt}(t)$ when the predictor feature has a value $X_m$, for each $X_m$;

(h) means for defining a number of pairs of sets $SX_i(t+1)$ and $\overline{SX}_i(t+1)$ of predictor feature values $X_m$, where i is an integer greater than zero and less than or equal to (M−1), each set $SX_i(t+1)$ containing only those predictor feature values $X_m$ having the i lowest values of $P(SY_{opt}(t)|X_m)$, each set $\overline{SX}_i(t+1)$ containing only those predictor feature values $X_m$ having the (M−i) highest values of $P(SY_{opt}(t)|X_m)$;

(i) means for finding a pair of sets $SX_{opt}(t+1)$ and $\overline{SX}_{opt}(t+1)$ from among the pairs of sets $SX_i(t+1)$ and $\overline{SX}_i(t+1)$ such that the pair of sets $SX_{opt}(t+1)$ and $\overline{SX}_{opt}(t+1)$ have the lowest uncertainty in the value of the category feature; and (l) means for outputting the set $SX_{opt}(t+1)$ as the decision set.

* * * * *